Aug. 2, 1932.    N. SEAHOLM    1,869,586
SURGEON'S KNIFE
Filed April 9, 1931
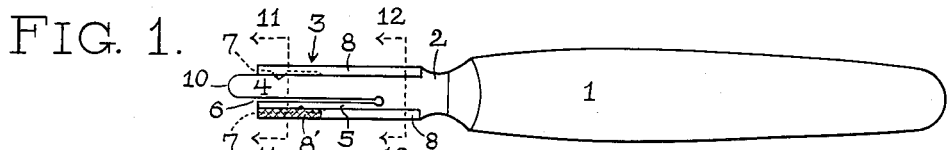
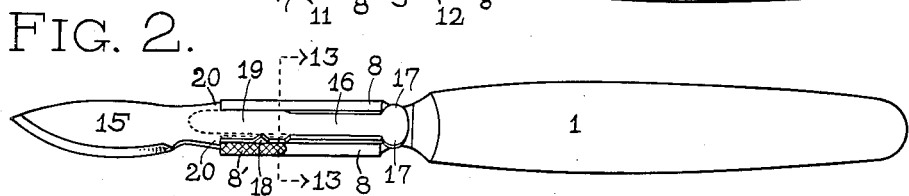
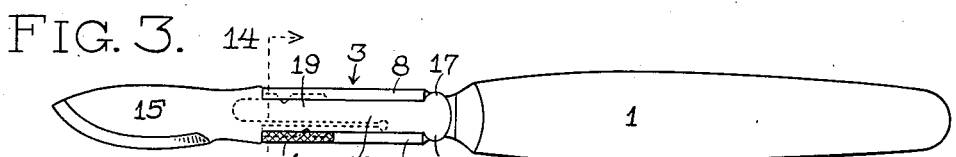
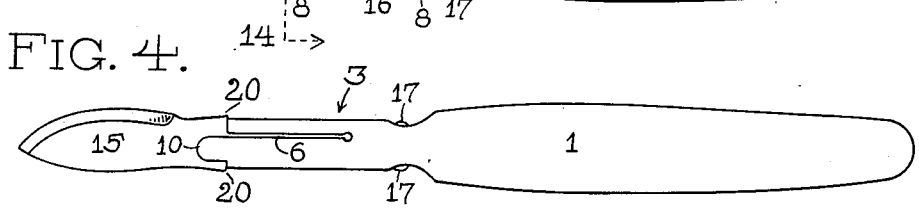
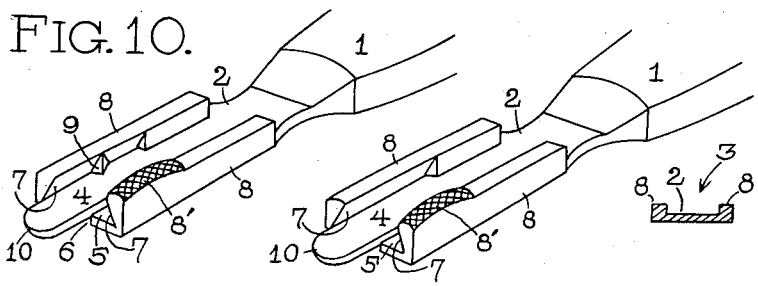
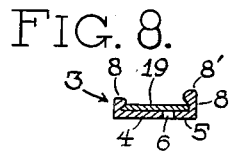
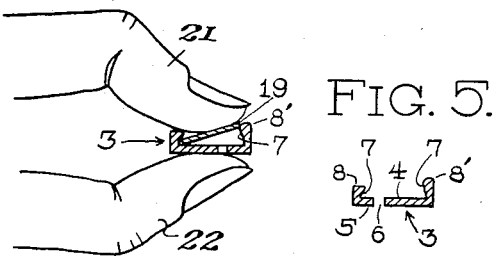
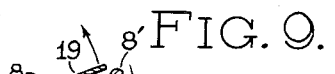
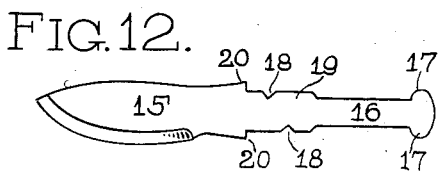

Patented Aug. 2, 1932

1,869,586

UNITED STATES PATENT OFFICE

NILS SEAHOLM, OF MOUNT VERNON, NEW YORK

SURGEON'S KNIFE

Application filed April 9, 1931. Serial No. 528,816.

This invention relates to knives useful to surgeons and others wherein a handle is so constructed that a detachable blade may be placed with its shank in initial position upon a gripping portion of said handle and then snapped into place by finger pressure; the blade is, of course just as readily removed by a twisting action whereby one edge is snapped loose and raised from the handle.

The main object of my invention is to provide a handle for detachable blades which will rigidly grip a blade in position thereon and prevent any shake or rattle thereof in use.

Another object is to provide a handle of the character indicated which can conveniently and instantly grip a blade in secure position without any dangerous sliding or axial movements of said blade being necessary to properly locate or fix the same.

A further object is to provide such a knife handle from which a blade can be instantly removed without any sudden flexure or springing thereof or subsequent jumping out of control which might cause accidents.

It is also an object of my invention to make a knife handle which, while having certain flexible gripping characteristics, will nevertheless securely hold a blade, due to inherent strength of design as well as to a blade supporting tongue, and which handle is also simple and reasonable to manufacture.

Other objects and the various advantageous novel features of my invention will appear more fully in detail hereinafter as this specification proceeds.

In the accompanying drawing forming part hereof,

Fig. 1 is a plan view of a knife handle made according to my invention and embodying the main features thereof in one practical form thereof.

Fig. 2 is a similar view of the same handle with a blade placed in initial position thereon in order to be subsequently secured in place.

Fig. 3 is a view similar to Fig. 2, wherein the blade is shown finally secured in position.

Fig. 4 is a view of the reverse side of the assembled knife and handle of Fig. 3.

Fig. 5 is a transverse section of Fig. 1 on line 11, 11.

Fig. 6 is also a transverse section of Fig. 1, on line 12, 12.

Fig. 7 is a transverse section of Fig. 2 on line 13, 13 showing two fingers in contact with the blade and handle portions illustrated.

Fig. 8 is a transverse section of Fig. 3 on line 14, 14 the blade being in position.

Fig. 9 is a similar view with the blade in raised position as assumed during removal.

Fig. 10 is a fragmentary perspective view of the blade gripping end of the handle shown in Fig. 1.

Fig. 11 is a slight modification of Fig. 10.

Fig. 12 is a view of the blade alone which is also illustrated in Figs. 2 and 3.

Fig. 13 is a slight modification which blade is more particularly adapted to fit the handle illustrated in Fig. 11.

Throughout the views, the same reference numerals indicate the same or corresponding parts.

In surgeons' knives wherein the blades are removable from the handles thereof, there are usually two features present, both of which are possible sources of danger and accident, and in addition are not convenient. The first feature or disadvantage is that in such knives the blade must be slid forward or backward in order to secure or release them, while the other disadvantage is that the blade is usually sprung to a certain extent while being released and upon being fully and finally set free, tends to suddenly straighten out and jump off the handle. This is, of course, a dangerous condition of affairs, as it is easy to be cut while securing or releasing a blade in such cases, and certainly it is dangerous to have a blade of razor sharpness fly off the handle in actual fact upon release.

In order to remove these obvious disadvantages from the art, and also include various novel objects before mentioned, the present invention has been designed. Hence, in the practice of my invention, a handle 1 is narrowed down to a neck or narrow section 2 which is also preferably thinned from one side to present a thinner cross section than the handle proper. Beyond the narrow section or neck 2, the handle is formed into a blade gripping section generally indicated by a reference 3, and which has a pair of correspondingly opposite clamping walls 8, 8. The floor of the handle between the walls is divided more than half the length of the walls into a wide blade supporting ledge 4 and a narrow supporting ledge 5 by means of a cut or channel 6, while the wider ledge is continued axially so as to project as a blade supporting tongue 10. Thus the tongue end of the blade gripping handle end may be termed the outer end for short. The purpose of the dividing channel 6 will presently appear.

However, beginning at the outer end of the blade gripping portion of the handle, both of the clamping walls are undercut or formed in a dovetail form about half their length upon their inner facing sides as indicated at 7, 7. The term undercut herein preferably refers to a dovetail form of cut, but any other form of cut is within the scope of my invention. It may be mentioned at this point that for the sake of convenience and the manipulations of the handle and blade about to be explained, a finger grip or knurl pad 8′ is preferably disposed upon one of the walls 8, the same being made higher at that point. Now, in order to utilize the structure thus far described, a blade 15 may now be considered in connection with the same. This blade is formed with a relatively wide shank 19 beyond the corners or shoulders 20, 20 of the blade proper, and beyond the wide shank is a relatively narrow shank 16 terminated by a pair of corresponding side lugs 17, 17. The shoulders 20, 20 and lugs 17, 17 may serve to locate the shank portion as a whole in proper position upon the blade gripping end of the handle when it is desired to secure the blade to said handle. On the other hand, in order to ensure proper register of the shank with the clamping walls, the undercut grooves 7 therein may each be provided with a projection or tooth as indicated at 9, while the wide shank portion may have corresponding notches 18, 18. The length of the wide shank portion is approximately the same as, or slightly less than the length of the undercut grooves 7, 7 in clamping walls 8, 8.

Now, when about to secure the blade to the handle, the general shank portion is laid upon gripping or clamping end 3 so that the upper edge of the wide shank portion is engaged in the undercut portion 7 of the upper wall 8, while the lower sharp edge of the blade is raised as shown in Figs. 2 and 9. Here the lower edge of the wide shank section 19 rests on the upper edge of the lower clamping wall 8, and now the utility of the divided condition of the clamping end of the handle will be apparent. If the fingers, as indicated at 21 and 22 in Fig. 6 are used to press down shank section 19 while supporting the handle, the clamping walls will spring apart and allow the raised edge of the blade to snap down into engagement at section 19 with the second groove 7. The blade as a whole will then lie conformably upon the floor of the clamping section between walls 8, 8, and upon tongue 10, while the dovetail walls, 7, 7 very securely grip and clamp the edges of shank section 19 and prevent all possible tendency of the blade to shake or rattle during use.

When the blade is to be replaced by a new one or one of different form, it is but necessary to hold the handle 1 in one hand and grip the blade from its dull edge, and then raise and release one edge of the blade by a twisting action, and the blade snaps free and remains between the fingers.

Sometimes it may be desired to eliminate the projections on teeth 9, 9 from the dovetail sections 7, 7 in clamping walls 8, 8, and in Fig. 9 such a case is illustrated, this being possibly a little simpler to manufacture. The blade would still fit when these teeth were missing, but the teeth also prevent axial sliding movement of the blade, not merely while being inserted or removed, but while in place and in use. However, the blade 23, whose actual form is of no moment herein, has a wide shank section 24 devoid of any notches and adapted to cooperate with the handle of Fig. 9. If the clamping action of the clamping end of the handles is very strong, the locating teeth or projections 9, 9 and the corresponding blade notches 18, 18 will hardly be missed and the blade can still be effectively snapped on and off the handle in a perfectly safe and satisfactory, as well as convenient manner.

Having now fully described my invention, I claim:

1. The combination, with a blade having a relatively wider shank section and beyond the same a relatively narrower shank section, of a handle to which said blade may be attached or removed, including a handle proper terminating at one end in a blade clamping end comprising a pair of opposite clamping walls yieldably connected and undercut upon their inner opposed sides from the outer ends thereof to a point intermediate the extremities thereof in order to grip said wider shank section and means for supporting said blade including a pair of ledges associated with said clamping walls, and registering projections in the undercut sections of said clamping walls, there being corresponding notches in the edges of said wider shank section, to engage with said projections in order to properly locate said blade with respect to said handle.

2. The combination, with a blade having a shank section which is notched in one edge thereof, of a handle to which said blade may be attached at will, including a handle proper terminating in one end in a blade clamping extremity comprising a pair of yieldably connected opposite clamping walls undercut with dove-tail slots upon their inner opposed sides from the outer ends thereof to a point intermediate the extremities thereof in order to grip said shank section, means for supporting said blade including a pair of ledges associated with said clamping walls, and a projection in the undercut portion of one of said clamping walls corresponding with the notched edge of said blade shank and engageable therewith in order to locate said blade in proper position upon said handle.

3. The combination, with a blade having a shank section which is notched in the side edges thereof, of a handle to which said blade may be attached at will, including a handle proper terminating in one end in a blade clamping extremity comprising a pair of yieldably connected opposite clamping walls undercut upon their inner opposed sides from the outer ends thereof to a point intermediate the extremities thereof in order to grip said shank section, means for supporting said blade including a pair of ledges associated with said clamping walls, and a projection in the undercut portion of each of said walls corresponding with the notched side edges of the shank in order to properly locate said blade upon said handle, and further means to support said blade including a tongue associated with one of said pair of ledges and projecting beyond the clamping walls and their associated ledges.

4. The combination, with a blade having a shank section which is notched in one side edge thereof, of a handle to which said blade may be attached at will, including a handle proper terminating in one end in a blade clamping extremity comprising a pair of yieldably connected clamping walls undercut upon their inner opposed sides from the outer ends thereof to a point intermediate the extremities thereof in order to grip said shank section, means for supporting said blade including a pair of ledges associated with said clamping walls, and a projection in the undercut portion of one of said clamping walls corresponding with the notched edge of said shank and engageable therewith in order to properly locate said blade upon said handle.

Signed at 132 Nassau Street, New York city, in the county of New York and State of New York this 27th day of March, A. D. 1931.

NILS SEAHOLM.